US006904483B2

(12) United States Patent
Koning et al.

(10) Patent No.: US 6,904,483 B2
(45) Date of Patent: Jun. 7, 2005

(54) SYSTEM AND METHOD FOR PRIORITY INHERITANCE

(75) Inventors: Maarten Koning, Bloomfield (CA); Andrew Gaiarsa, Carp (CA)

(73) Assignee: Wind River Systems, Inc., Alameda, CA (US)

( * ) Notice: Subject to any disclaimer, the term of this patent is extended or adjusted under 35 U.S.C. 154(b) by 524 days.

(21) Appl. No.: 09/812,752

(22) Filed: Mar. 20, 2001

(65) Prior Publication Data

US 2002/0138679 A1 Sep. 26, 2002

(51) Int. Cl.$^7$ ............................. G06F 13/38; G06F 9/46
(52) U.S. Cl. .................................... 710/244; 718/103
(58) Field of Search ........................ 710/224, 264–265; 709/100–104; 713/400

(56) References Cited

U.S. PATENT DOCUMENTS

| | | | | | |
|---|---|---|---|---|---|
| 5,313,630 | A | * | 5/1994 | Namioka et al. ........ | 707/103 R |
| 5,515,538 | A | * | 5/1996 | Kleiman .................. | 710/260 |
| 5,872,909 | A | * | 2/1999 | Wilner et al. ............ | 714/38 |
| 5,937,187 | A | * | 8/1999 | Kosche et al. ........... | 718/104 |
| 5,944,778 | A | * | 8/1999 | Takeuchi et al. ......... | 718/100 |
| 6,301,602 | B1 | * | 10/2001 | Ueki ...................... | 718/103 |
| 6,560,627 | B1 | * | 5/2003 | McDonald et al. ...... | 718/103 |
| 6,560,628 | B1 | * | 5/2003 | Murata ................... | 718/103 |
| 6,587,955 | B1 | * | 7/2003 | Foote et al. ............. | 713/400 |
| 2002/0133530 | A1 | * | 9/2002 | Koning ................... | 709/102 |
| 2002/0198925 | A1 | * | 12/2002 | Smith et al. ............. | 709/104 |
| 2003/0061395 | A1 | * | 3/2003 | Kingsbury et al. ...... | 709/312 |
| 2003/0154234 | A1 | * | 8/2003 | Larson .................... | 709/107 |

OTHER PUBLICATIONS

David Polock et al., "Conformance Testing of Priority Inheritance Protocols" Real–Time Computing Systems and Applications, 2000. Dec. 12–14, pp. 404–408.*
Mercer, C.W. et al. "The Arts real–time object model" Real–Time Systems Symposium, Dec. 5–7, 1990; Pages 2–10.*
"Microkernel Semaphores" IBM Technical Disclosure Bulletin, Jul. 1995, vol. 38, Issue 7, pp. 111–118.*
"Priority Inheritance Protocals: An Approach to Real–Time Synchronization" IEEE, US, NY, vol. 39, No. 9, Sep. 1, 1990, pp. 1175–1185.*

* cited by examiner

Primary Examiner—Paul R. Myers
(74) Attorney, Agent, or Firm—Fay Kaplun & Marcin LLP

(57) ABSTRACT

A method for controlling priority inheritance in a computer system is described, the method including testing a priority inheritance variable associated with a task, and lowering the current priority of a task when testing the priority inheritance variable indicates that the task holds no resources that are involved in a priority inheritance.

14 Claims, 16 Drawing Sheets

Legend:

Task Receives Resource

Task Requests Resource That Is Unavailable

Higher Priority Task Preempts Lower Priority Task

Legend:

Task Receives Resource

Task Requests Resource That Is Unavailable

Higher Priority Task Preempts Lower Priority Task

SYSTEM AND METHOD FOR PRIORITY INHERITANCE A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

Traditional multitasking operating systems (e.g., UNIX, Windows) have been implemented in computing environments to provide a way to allocate the resources of the computing environment (e.g., CPU, memory, Input/Output (I/O) devices) among various user applications that may be running simultaneously in the computing environment. The operating system itself includes a number of functions (executable code) and data structures that may be used to implement the resource allocation services of the operating system. A program that performs actions may be referred to as a task (also known as a "thread"), and a collection of tasks may be referred to as a "process". Upon loading and execution of the operating system into the computing environment, "system tasks" and "system processes" are created in order to support the resource allocation needs of the system. User applications likewise, upon execution, may cause the creation of tasks ("user tasks") and processes ("user processes") in order to perform the actions desired from the application.

Systems may often include shared resources that when accessed by a first task, should not be subsequently accessed by a second task until the first task's use of the resource has been completed. Examples of such shared resources may include a tape, a table in a database, a critical region in memory, etc. Operating systems may include one or more mutual exclusion control mechanisms that may be used to prevent a second task's access to such shared resources while the resources are in use by a first task. A mutual exclusion control mechanism may include functions such as disabling interrupts, preemptive locks, or mutual exclusion semaphores.

Operating systems also may include a priority control mechanism to control the execution of both system and user tasks. In a priority control mechanism, tasks may be assigned a priority value, e.g., a number ranging from a lowest priority to a highest priority. When multiple tasks contend for resources, a higher priority task generally receives more resources from the system than a lower priority task. A system including a priority control mechanism generally will not force a higher priority task to wait for a lower priority task to complete, but instead, where possible, may preempt the lower priority task until the high priority task either terminates, has its priority lowered, or stops for some other reason.

Some systems include a so-called "absolute" priority mechanism. In an "absolute" priority mechanism, lower priority tasks never preempt higher priority tasks. A higher priority task generally receives all available system resources until it completes, or until an even higher priority task interrupts the task. However, altering the control of a critical shared resource in the middle of the low priority task's use of the resource may jeopardize the integrity of the resource. For example, if the lower priority task is currently writing to a table in a database, allowing another higher priority task to write while the lower priority task's write operation is in progress may damage the integrity or consistency of the table. Therefore, mutual exclusion control mechanisms may be configured to allow a lower priority task to maintain control of a critical shared resources even when a lower priority task is preempted by higher priority tasks.

A "priority inversion" may occur when a lower priority task holds a resource that is needed by a higher priority task. FIG. 1 illustrates the effect of a priority inversion in an example system. Suppose, as shown at 102, that task C, a low priority task, is currently executing. At 104, task C takes a shared resource that is controlled with a mutual exclusion control mechanism. At 106, task A, a high priority task, preempts task C and begins to execute. At 108, task A attempts to take the resource currently held by task C. The mutual exclusion control mechanism prevents task A from accessing the resource until Task C has finished using the resource. Thus, Task A may "block", i.e., Task A stops executing and waits to receive the resource. The system may place task A on a "wait" queue and allow other tasks to execute while the blocked task waits. Task C then begins to execute, until 110, when task C is preempted by task B, a medium priority task with priority higher than task C but lower priority than task A. At 110, the resource is still held by task C. Thus, task A is still blocked while task B executes, even though task A has a higher priority than task B and task B is not the task holding the resource for which task A is waiting. When task B finishes execution at 112, task C continues its execution until it finishes with the resource at 114. Then, task A can acquire the resource and begin executing. Effectively, while task A was blocked on the resource held by task C, task A waited for task B as if task A had the same low priority as task C. This problem is called a "priority inversion". Priority inversion is undesirable in many applications, particularly in real-time systems which seek to guarantee the real-time performance of certain tasks.

A conventional solution to the problem of priority inversion is "priority inheritance", i.e., raising the priority of a low priority task holding a resource needed by a higher priority task. An example of priority inheritance is illustrated in FIG. 2. Similar to the example illustrated in FIG. 1, in the example illustrated in FIG. 2, task C begins executing at 202. Task C acquires the resource at 204. Task C is preempted by high priority task A at 206. Task A attempts to take the resource, held by task C, at 208. However, when task A blocks on the resource held by task C, the current priority of task C is temporarily raised to the priority of task A, i.e., task C "inherits" the priority of task A. Thus task B does not preempt task C, and task C runs uninterrupted until it gives the resource to task A at 210. When task C has finished using the resource and gives it to task A, task C's current priority is reduced to its original base priority. When Task A acquires the resource, task A unblocks and preempts task C. Task A then runs to completion at 212. Task B does not run until after Task A has completed. A priority inversion has been avoided by using priority inheritance.

Priority inheritance has been previously implemented using various "stack" or "record" algorithms. In these algorithms, all unsatisfied requests for resources are tracked, e.g., by using a stack or other data structure with an entry for each unsatisfied resource request. The current priority of a task holding resources is raised to the priority of the highest priority task blocked on any resource held by the task. Each time a task releases a resource, e.g., by giving a semaphore, the data structure entry corresponding to the satisfied request for that resource is deleted. If a blocked task is deleted or times out, the corresponding resource request may also be deleted. Then, the current priority of the task that gave up the resource may be adjusted downward to the priority of the highest priority task still waiting to receive a resource from the task, or if no higher priority tasks are waiting, to the base priority of the task. The stack algorithm has the advantage of insuring that priority inheritance is limited, both in duration and in the priority level that is inherited. However, the stack algorithm does not use a predetermined amount of memory to track priority inheritance, i.e., the amount of memory used increases significantly as the number of resources that are held by a task increases. In addition, the stack algorithm may be computationally intensive, particularly as the number of resources that are tracked increases. Unbounded memory consumption and large computational overhead are undesirable properties, particularly in real time or embedded systems. Because priority control and mutual exclusion control mechanisms may run in the operating system kernel, the undesirability of computational overhead and unbounded memory consumption is magnified.

A conventional alternative to the stack algorithm that has been used in real time and embedded systems is the so-called "ratchet algorithm". See, e.g., Wind River® VxWorks® Programmer's Guide Version 5.4, at p.54. In the ratchet algorithm, when a task blocks on a resource protected by a mutual exclusion control mechanism and held by a lower priority task, the resource-holding task's current priority is raised to the current priority of the resource-requesting task. The resource-holding task's priority is lowered to its base priority when the resource-holding task has released all of the resources protected by a mutual exclusion control mechanism that the resource-holding task holds. The ratchet algorithm may be implemented by maintaining a count of the number of resources protected by a mutual exclusion control mechanism that are held by a task. The count is incremented each time the task takes or acquires a resource protected by a mutual exclusion control mechanism. The count is decremented each time a resource protected by a mutual exclusion control mechanism is released. The task's priority is lowered to its base priority whenever the count of resources protected by a mutual exclusion control mechanism that are held by the task is decremented to zero.

Unlike the stack algorithm, the ratchet algorithm is computationally simple and has limited memory requirements, needing only a predetermined amount of memory for each task, i.e., a single counter variable for each task, and variables for recording each task's base and current priorities. However, in the ratchet algorithm, tasks will often retain a higher inherited priority for longer than is necessary to prevent priority inversion. This results in poor real time performance for other higher priority tasks. For example, in the example illustrated in FIG. 2 and described above, low priority task C might retain its higher inherited priority after releasing the resource at 210 if task C held another resource protected by a mutual exclusion control mechanism. The real time performance of the medium priority task B, or even possibly high priority task A, would be negatively effected if task C retained its higher inherited priority for longer than necessary.

SUMMARY OF THE INVENTION

In accordance with an example embodiment of the present invention, a method is provided that includes testing a priority inheritance variable associated with a task, and lowering a current priority of the task when testing the priority inheritance variable indicates that the task holds no resources that are involved in a priority inheritance.

Also in accordance with an example embodiment of the present invention, a method is provided that includes testing a priority inheritance variable associated with a task, the priority inheritance variable configured to have a value indicative of the number of inversion safe mutual exclusion semaphores held by the task that higher priority tasks are waiting to receive, and setting a current priority of the task to a base priority value when testing the priority inheritance variable indicates that no higher priority tasks are waiting to receive inversion safe mutual exclusion semaphores held by the task.

Also in accordance with an example embodiment of the present invention, a system is provided that includes a task, a priority inheritance variable, the priority inheritance variable associated with the task and configured to indicate the number of resources that are held by the task and that at least one higher priority tasks is blocked on, and a mutual exclusion control mechanism configured to set a current priority of the task to a base priority value when the priority inheritance variable indicates that no higher priority tasks are blocked on resources held by the task.

Also in accordance with an example embodiment of the present invention, a system is provided that includes a task, a priority inheritance variable associated with the task, the variable configured to indicate the number of inversion safe mutual exclusion semaphores that are held by the task and that at least one higher priority task is blocked on, and a mutual exclusion control mechanism configured to set a current priority of the task to a base priority value when the priority inheritance variable indicates that no higher priority tasks are blocked on inversion safe mutual exclusion semaphores held by the task.

Also in accordance with an example embodiment of the present invention, a system is provided that includes a semaphore and a variable, the variable associated with the semaphore and configured to indicate whether a pending request for the semaphore has resulted in a priority inheritance.

Also in accordance with an example embodiment of the present invention, a system is provided that includes tracking a number of resources held by a task that higher priority tasks are presently blocked on, the tracking using only a predetermined amount of memory, raising a current priority of the task when a higher priority task blocks on a resource held by the task, and setting the current priority of the task to a base priority value whenever no higher priority tasks are waiting to receive any of the resources held by the task and the task still holds at least one resource.

Also in accordance with an example embodiment of the present invention, an article of manufacture is provided, the article of manufacture including a computer-readable medium having stored thereon instructions adapted to be executed by a processor, the instructions which, when executed, define a series of steps to be used to control priority inheritance, the steps including: testing a priority inheritance variable associated with a task, and lowering a current priority of the task when testing the priority inheritance variable indicates that the task holds no resources that are involved in a priority inheritance.

DETAILED DESCRIPTION

Figure 1:
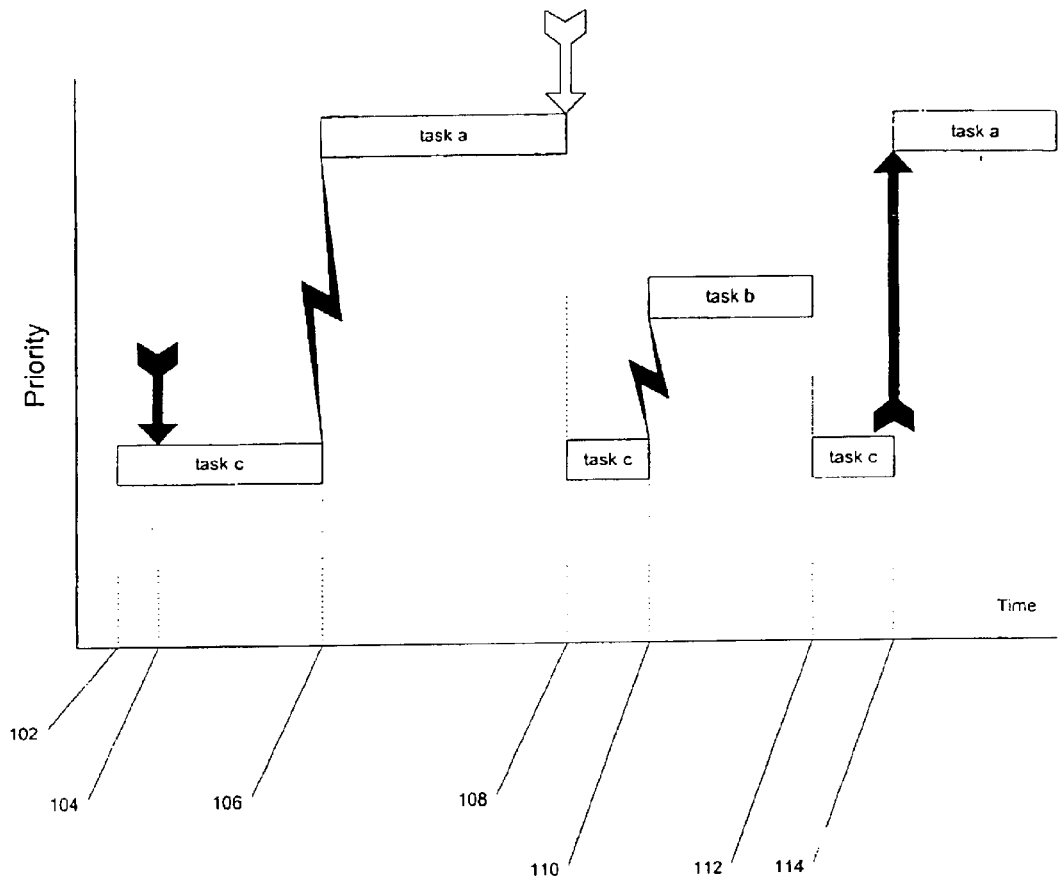
FIG. 1 illustrates an example execution of tasks without priority inheritance.
Figure 1:
Figure 1:
Figure 1:
Figure 2:
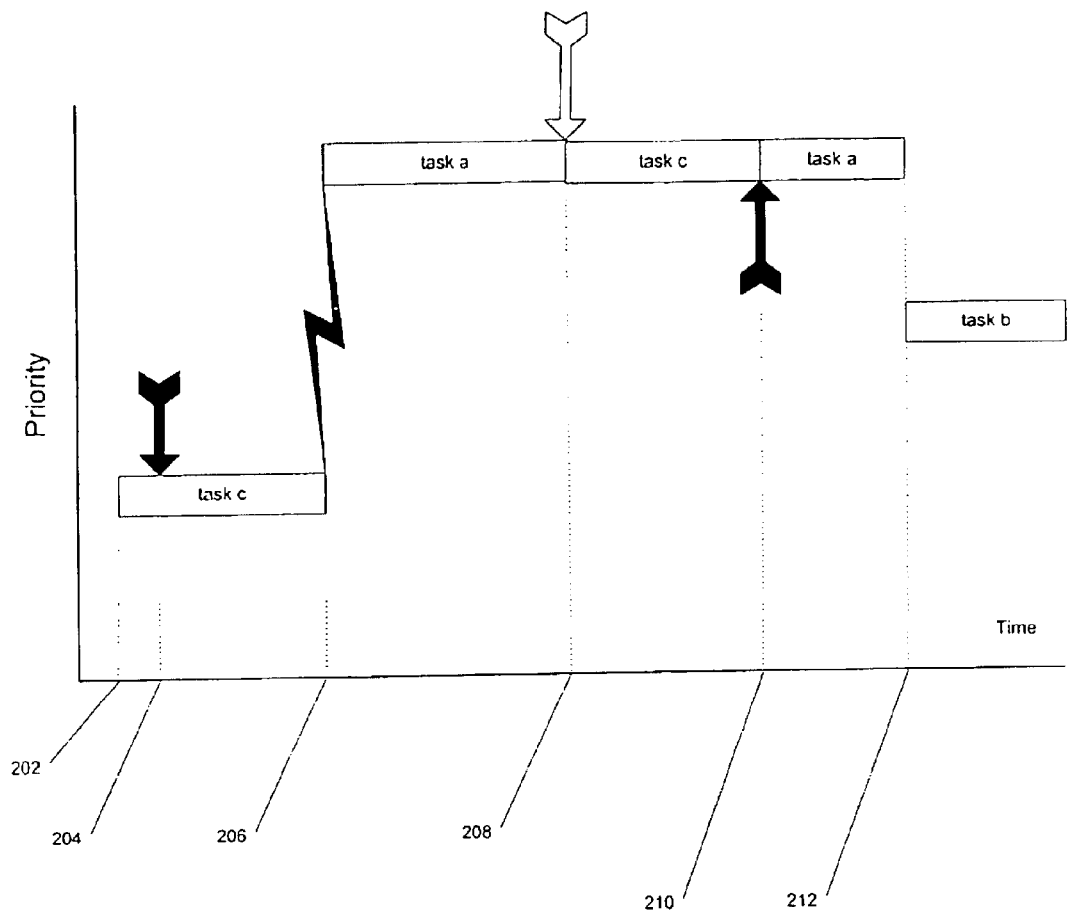
FIG. 2 illustrates an example execution of tasks with priority inheritance.
Figure 2:
Figure 2:
Figure 2:

An example embodiment according to the present invention may be implemented as part of a computer operating system. The example embodiment may include a priority control mechanism, a mutual exclusion control mechanism, mechanisms to control priority inheritance, as well as other conventional features of computer operating systems.

The example embodiment according to the present invention may include an absolute priority control mechanism. It will be appreciated that any conventional method of implementing a priority control mechanism may be employed. In the discussion below, it is assumed that high priority tasks have a higher priority number than low priority tasks. It will be appreciated that other conventions for indicating relative priority may be used, as long as they are used consistently. For example, a system could be implemented where 0 indicated the highest priority, rather than the lowest priority, and where higher numbers indicated lower priority.

In an example embodiment according to the present invention, several types of semaphores may be included as part of the mutual exclusion control mechanism. A task may "take" or acquire a semaphore by invoking a "take" function that may be provided as part of the operating system. The task may release or "give" a semaphore it holds by invoking a "give" function that may be provided as part of the operating system.

A second task may generally not take the same semaphore until the task that holds the semaphore releases or "gives" the semaphore. The take function may include one or more parameters that indicate whether, and for how long, a task should wait when it cannot take a semaphore. A task that invokes the "take" procedure for a semaphore that is held by another task blocks and may wait to receive the semaphore, either indefinitely, or for a maximum interval of time that may be specified in the invocation of the take function. The operating system may move a task that blocks on semaphore to a "wait" queue, allowing other tasks to execute while the blocked task waits. When a task is finished with the resource, it "gives" or "releases" the semaphore, allowing another task to use the resource. If a higher priority task is currently waiting for the resource, the give function may assign the resource directly to the waiting higher priority task.

The example embodiment may include "binary" semaphores that may be used primarily for synchronization. The example embodiment also includes a "flush" operation, for binary semaphores, that unblocks all tasks that are waiting for a particular semaphore. The flush function makes binary semaphores generally unsuitable for controlling resources that require strictly mutually exclusive access.

The example embodiment may also include "mutual exclusion semaphores". Mutual exclusion semaphores may be used to control access to a shared resource. Mutual exclusion semaphores in the example embodiment may include several features that make them more suitable than binary semaphores for controlling access to shared resources where mutually exclusive access is desired. In the example embodiment, a mutual exclusion semaphore may only be given by the task that took it. Also in the example embodiment, a mutual exclusion semaphore may not be given during an interrupt service routine, a special procedure used to handle hardware interrupts without context switching. Also in the example embodiment, a mutual exclusion semaphore may not be flushed. Mutual exclusion semaphores may also be "inversion safe", i.e., designed to include a mechanism for priority inheritance.

Resources that require mutual exclusion may have associated semaphores that control access to the resource. The association between a mutual exclusion semaphore and a resource may be indicated by any conventional mechanism, e.g., by including a pointer in a semaphore control data structure to the associated resource. The operating system may prevent access to a resource by tasks that do not currently hold the associated semaphore. When a task wants to access a shared resource that is controlled by a mutual exclusion semaphore, it must first acquire or take the semaphore associated with that resource, e.g., by invoking a "take" function made available as part of the operating system. As long as the task keeps the semaphore, all other tasks seeking access to the resource are blocked from accessing the resource. A task that invokes the "take" procedure for a mutual exclusion semaphore that is held by another task may block and wait, either indefinitely, or for an interval of time that may be specified in the invocation of the take function. When a task is finished with the resource, it "gives" or "releases" the semaphore, allowing another task to use the resource. If a higher priority task is currently waiting for the resource, the give function may assign the resource to the waiting higher priority task.

An example embodiment according to the present invention may include procedures for controlling priority inheritance in a computer operating system. These procedures may be included as part of operating system functions used to take and give semaphores. Priority inheritance procedures may also be included as optional features in the functions that define semaphores, e.g., a flag may be used when a semaphore is created to indicate the semaphore is "inversion safe", i.e., that gives and takes involving the semaphore may result in priority inheritance.

It will be appreciated that the priority inheritance procedures described for use with mutual exclusion semaphores could readily be adapted for use with other mutual exclusion control mechanisms, or with other types of semaphores.

Priority Inheritance Procedure when a Task Attempts to Take a Semaphore

Figure 3:
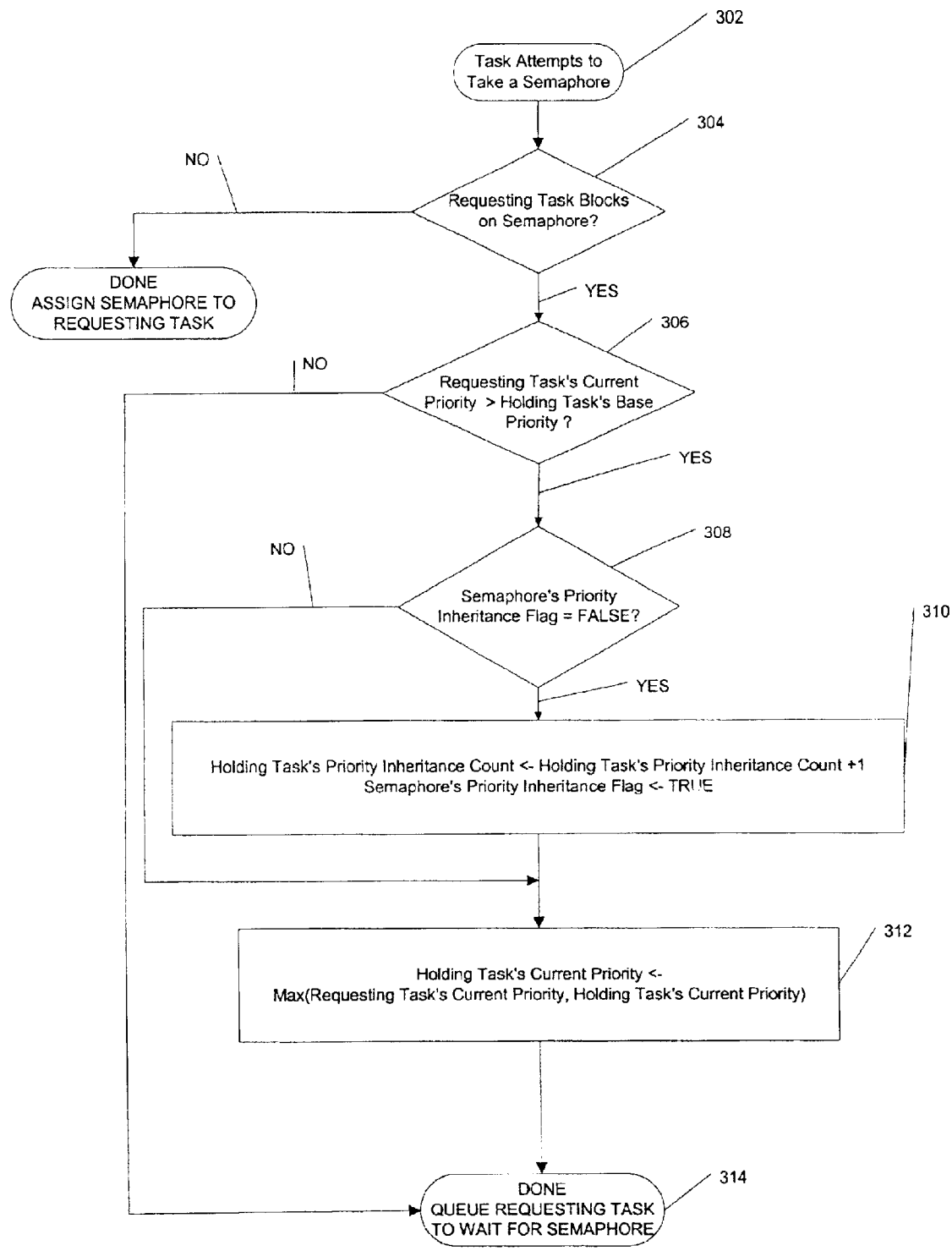
FIG. 3 illustrates an example procedure for handling priority inheritance during a semaphore request, according to an example embodiment of the present invention.

FIG. 3 illustrates an example procedure for handling priority inheritance during a "take" or request for a semaphore, according to an example embodiment of the present invention. The example procedure may be included as part of a function call or procedure for "taking" a semaphore that controls access to a resource. It will be appreciated that similar procedures may be used with other types of mutual exclusion control mechanisms.

In step 302, a task attempts to take a semaphore. This may be accomplished, for example, by invoking an operating system function call that carries out the procedure needed to take the desired semaphore. If the semaphore is not available, i.e., if the semaphore is currently held by another task, the operating system may cause the requesting task to "block", and may queue the requesting task to wait for the semaphore. In step 304, if the semaphore is available, the task attempting to take the semaphore does not block on the semaphore. Thus, a conventional procedure for assigning the semaphore to the requesting task may proceed and no further special steps need to be taken to deal with priority inheritance. However, if the task blocks on the semaphore, the example procedure may continue to step 306.

In step 306, the current priority of the requesting task is compared with the base priority of the task that currently holds the semaphore. If the current priority of the requesting task is greater than the base priority of the holding task, step 308 may be invoked, otherwise a conventional procedure for requesting a semaphore may be used.

In step 308, the semaphore may be tested to determine whether the semaphore is already involved in a priority inheritance, i.e., whether a task holding the semaphore has inherited a higher priority from a task currently waiting for the semaphore, or alternatively if the task holding the semaphore would have inherited a higher priority had it not already inherited a higher priority. The semaphore may have an associated variable indicative of whether the semaphore is currently involved in a priority inheritance, e.g., a priority inheritance flag. The priority inheritance flag may be included as part of a semaphore control data structure that is associated with each semaphore. Any conventional mechanism may be used to associate the semaphore control data structure with the associated semaphore. For example, in an object-oriented system, the semaphore control data structure may be included as part of a semaphore memory object. Alternatively, the operating system may use a table or other conventional data structure to track the correspondence between semaphores and semaphore control data structures.

If the semaphore is currently not involved in a priority inheritance, then step 310 is executed. In step 310, a priority inheritance variable associated with the task holding the semaphore may be adjusted. The priority inheritance variable associated with a task may be used to indicate whether the task currently holds a semaphore involved in a priority inheritance. The priority inheritance variable may be implemented in the example embodiment as a priority inheritance count, i.e., a count of the number of semaphores held by the task that are involved in priority inheritance. (Initially, when a task is created, the task's priority inheritance count may be set to 0.) If the priority inheritance variable is implemented as a priority inheritance count, the count may be incremented in step 310. Also in step 310, the semaphore's inheritance flag may be set to indicate that the semaphore is involved in a priority inheritance situation.

It will be appreciated that the priority inheritance variable may be associated with a task using any conventional mechanism. For example, the priority inheritance variable may be included as part of a task control block data structure for the task. In an object-oriented system, the priority inheritance variable may be included as part of a task memory object. Alternatively, the priority inheritance variable may be stored as part of a conventional data structure by the operating system, for example in a table or linked list that includes links or indices for determining which priority inheritance variable is associated with which task.

In step 312, the current priority of the task holding the semaphore may be set to the maximum of the current priority of the task holding the semaphore and the current priority of the task requesting the semaphore. The task's original or "base" priority may be saved so that when all semaphores held by the task that result in priority inheritance are released, the task's priority may be lowered to its original priority.

In step 314, the conventional steps needed for completing an attempt to take the semaphore may be carried out.

The example procedure for handling priority inheritance during a semaphore take may also include "priority chaining". When a second task blocks on a semaphore currently held by a first task, a variable associated with the second task may be set to identify the semaphore which caused the task to block. This variable may be included as part of a task control block data structure associated with the each task. Subsequently, a third task may block on a semaphore held by the second task, and as a result the second task may have its priority increased as a result of priority inheritance. However, because the second task is blocked on the semaphore held by the first task, this priority inheritance might not prevent a priority inversion. Accordingly, when the priority of the second task is raised, the first task also needs to have its priority raised, if a priority inversion is to be avoided. In priority chaining, when the priority of a task is raised, e.g., due to priority inheritance, the priority of any task that currently holds a semaphore on which the task is blocked is also raised. It will be appreciated that this process may be repeated recursively, until an unblocked task has its priority raised or until a task that has a priority equal to or greater than the original blocked task is encountered. It will be appreciated that it may be useful to handle priority chaining as a separate function or routine, in order to allow greater optimization of the code in the unchained case, which may occur more commonly in many applications.

It will be appreciated that the order of the steps in the example procedure for handling priority inheritance during a semaphore take could be varied. For example, these steps could be intermingled with other steps that are conventionally used in procedures for taking semaphores.

It will also be appreciated that the example procedure for handling priority inheritance during a semaphore take would generally not be carried out for semaphores that are not "inversion safe", i.e., semaphores which are not intended to have an associated priority inheritance capability. A flag indicating whether a semaphore is inversion safe may be included as part of a data structure used to control the semaphore. A procedure for taking a semaphore may test the flag to detect if the semaphore is inversion safe before carrying out the example priority inheritance procedure described above.

It will also be appreciated that the steps of the procedure for handling priority inheritance during a semaphore take, described above, could be defined as a series of instructions adapted to be executed by a processor, and these instruction could be stored on a computer-readable medium, e.g., a tape, a disk, a CD-ROM.

Priority Inheritance Procedure when a Task Gives a Semaphore

Figure 4:
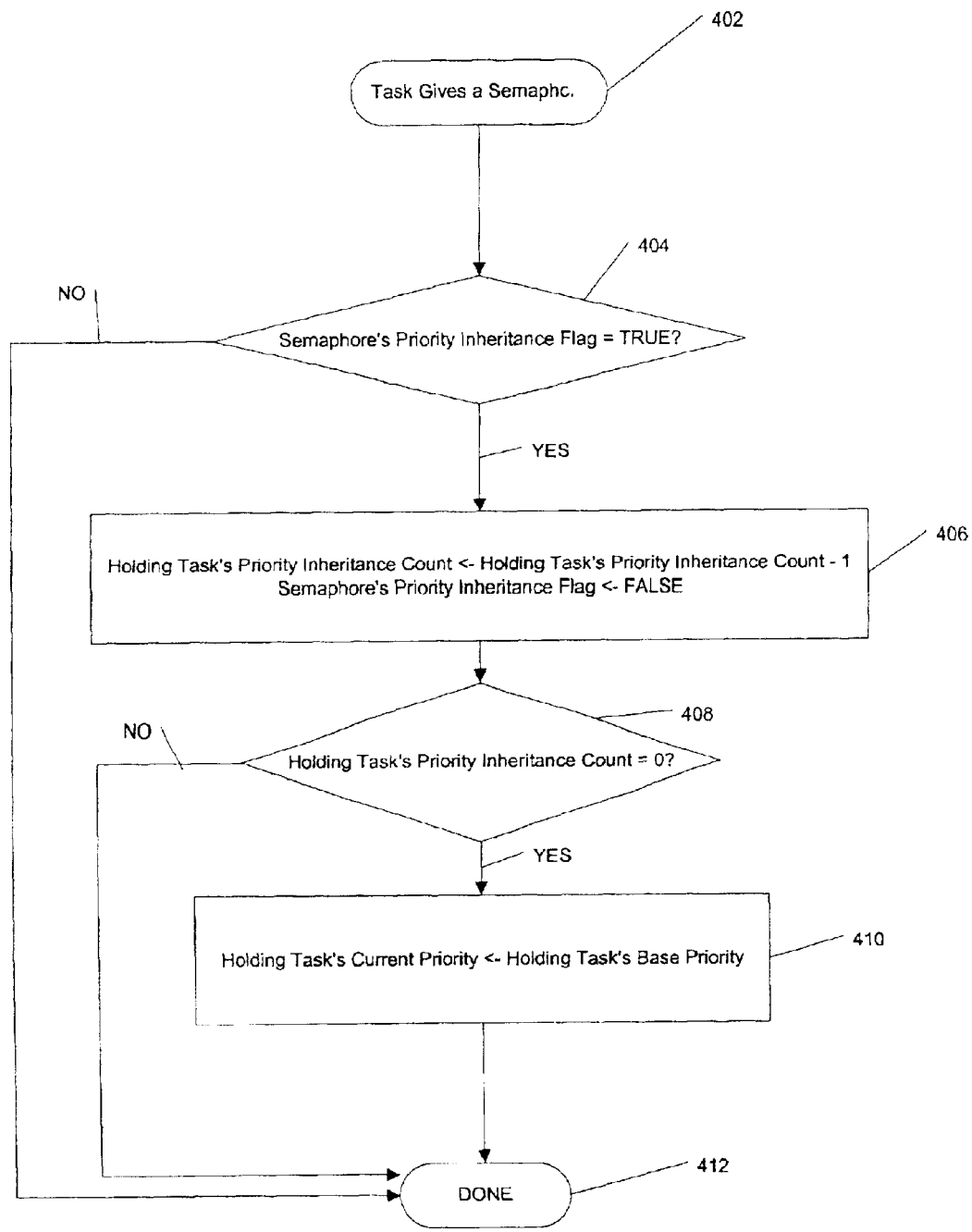
FIG. 4 illustrates an example procedure for handling priority inheritance during the release of a semaphore, according to an example embodiment of the present invention.

FIG. 4 illustrates an example procedure for controlling priority inheritance during the release of a semaphore, according to an example embodiment of the present invention. The example procedure may be used as part of an operating system function that may be invoked by a task that holds a semaphore, when the task is ready to release the resource controlled by the semaphore.

The example procedure begins in step 402 when a task gives a semaphore, for example, by invoking a "give" function provided by the operating system.

In step 404, the semaphore may be tested to determine whether it currently involved in a priority inheritance. This may be accomplished by testing a variable indicative of whether the semaphore is involved in a priority inheritance, e.g., a priority inheritance flag. If the semaphore is not currently involved in a priority inheritance, a conventional procedure for releasing the semaphore may be employed. If the semaphore is involved in a priority inheritance, the example procedure may proceed to step 406.

In step 406, the task that currently holds the semaphore may have its priority inheritance variable adjusted. For example, if the priority inheritance variable is implemented as a count, the count may be decremented. Because the semaphore is being released, the priority inheritance flag associated with the semaphore may be set to indicate the semaphore is no longer involved in a priority inheritance.

In step 408, the task releasing the semaphore may be tested to see if it still holds any other semaphores that are involved in a priority inheritance. This may be accomplished by testing whether the priority inheritance count for the task is still greater than zero. If the task is still holding a semaphore involved in a priority inheritance, the example procedure may proceed to step 412, where the conventional steps involved in releasing a semaphore may be completed. Alternatively, if the task is no longer holding any semaphores that are involved in a priority inheritance, the example procedure may proceed to step 410.

In step 410, because the task holding the semaphore no longer is involved in any priority inheritance situations, the task's priority may be reduced from its inherited priority to the task's base priority. This may be accomplished by assigning the tasks current priority a new value equal to the tasks base priority. Alternatively, this may be accomplished by using an operating system function call that assigns priorities to tasks, and makes any needed adjustments to operating system queues or other control variables.

It will be appreciated that the steps of the procedure for handling priority inheritance during the release of a semaphore, described above, may be defined as a series of instructions adapted to be executed by a processor, and these instruction could be stored on a computer-readable medium, e.g., a tape, a disk, a CD-ROM.

The example embodiment may include recursive semaphores, i.e., semaphores that can be taken multiple times by the same task. The example procedure shown in FIG. 4 and described above would typically not be carried out when a task gives a semaphore that is held recursively (i.e., multiple times). In the example embodiment, each semaphore may have a semaphore control data structure that includes a recursion count. The recursion count may be incremented each time a task takes a semaphore that it already holds. The procedure shown in FIG. 4 may be prefaced by test of a recursion count contained in the semaphore control data structure for the semaphore being given. If the recursion count for the semaphore is greater than 0 when a task gives the semaphore, the recursion count may be decremented, but the procedure shown in FIG. 4 would not be carried out. It will be appreciated that other procedures could also be used to properly handle recursive semaphores.

It will be appreciated that other procedures used in a system may be modified to more effectively manage priority inheritance. For example, it may be useful to modify any procedure used for setting the base priority of a task, so that such a priority setting procedure modifies the current priority of a task when the base priority is altered only if the task currently is not running at an inherited elevated priority. It may also be useful to adjust timeout and task deletion procedures, so that variables used to track priority inheritance are adjusted when a waiting task times out or is deleted, if that waiting task caused a priority inheritance when it blocked.

Example Computing Environment

Figure 5:
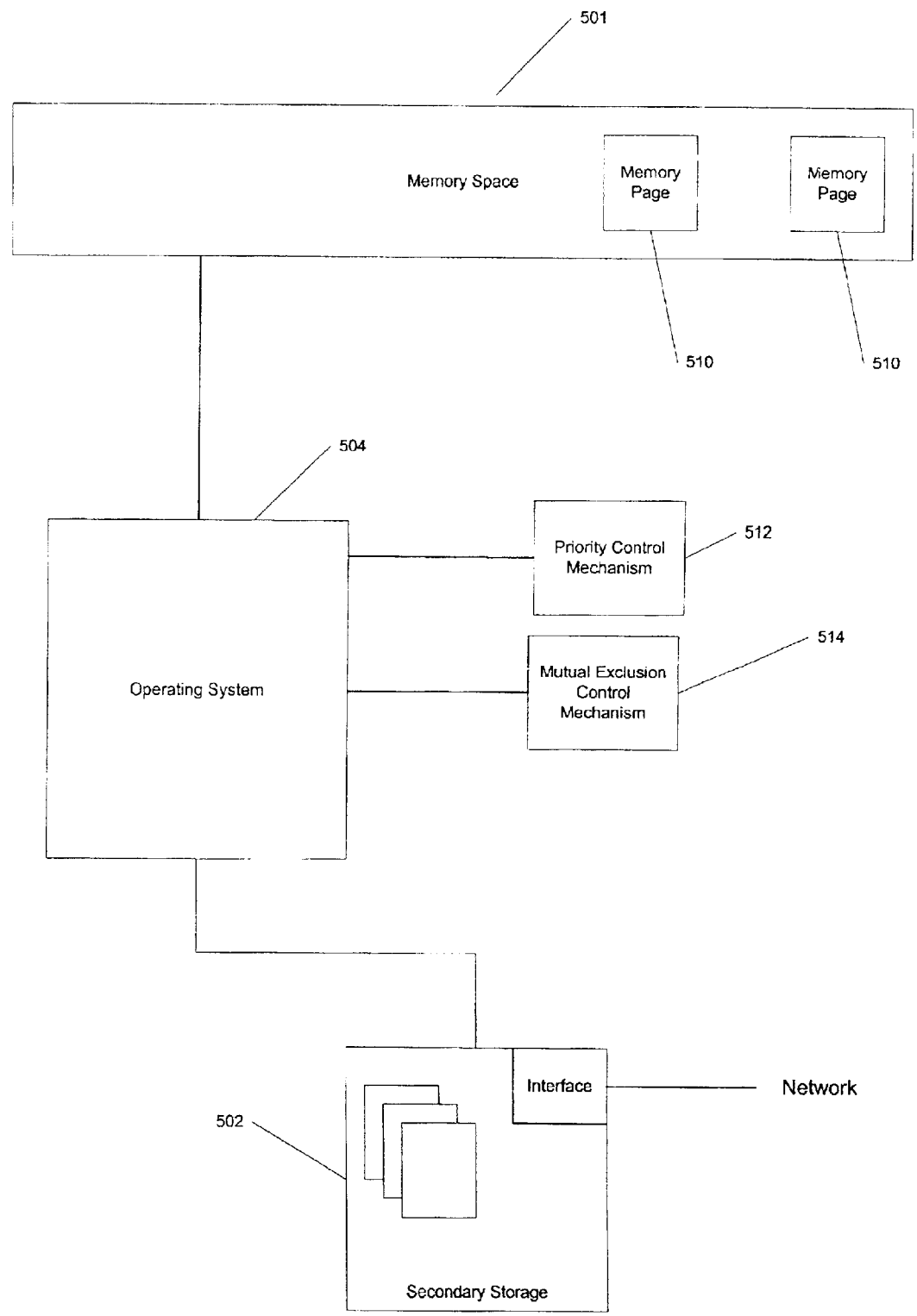
FIG. 5 illustrates an example computing environment, according to an example embodiment of the present invention.

FIG. 5 illustrates an example computing environment, according to an example embodiment of the present invention.

A memory space 501 may be provided as part of the computing environment. The memory space 501 may be addressed in any conventional manner, and may be divided into a plurality of memory pages 510.

A secondary storage system 502 may also be provided as part of the computing environment. The secondary storage system may include, disks, tapes, cd-roms, and other storage media. The secondary storage system may also include interfaces to networks that connect the example computing environment to other storage systems provided by other computer systems.

An operating system 504 may be included as part of the example computing environment. The operating system may include a priority control mechanism 512. The priority control mechanism may include functions for controlling the execution of tasks of different priorities. The operating system may also include a mutual exclusion control mechanism 514. The mutual exclusion control mechanism may be used control access to resources that require mutually exclusive access by tasks, e.g., portions of the memory space 501, and resources in the secondary storage system 502.

The mutual exclusion control mechanism may include functions to create, manage, and track mutual exclusion semaphores. The mutual exclusion control mechanism may also include functions allowing tasks to take and release mutual exclusion semaphores. It will be appreciated that the mutual exclusion control mechanism may be provided as a separate set of system functions, or may be integrated in other functions in the computing environment.

Figure 6:
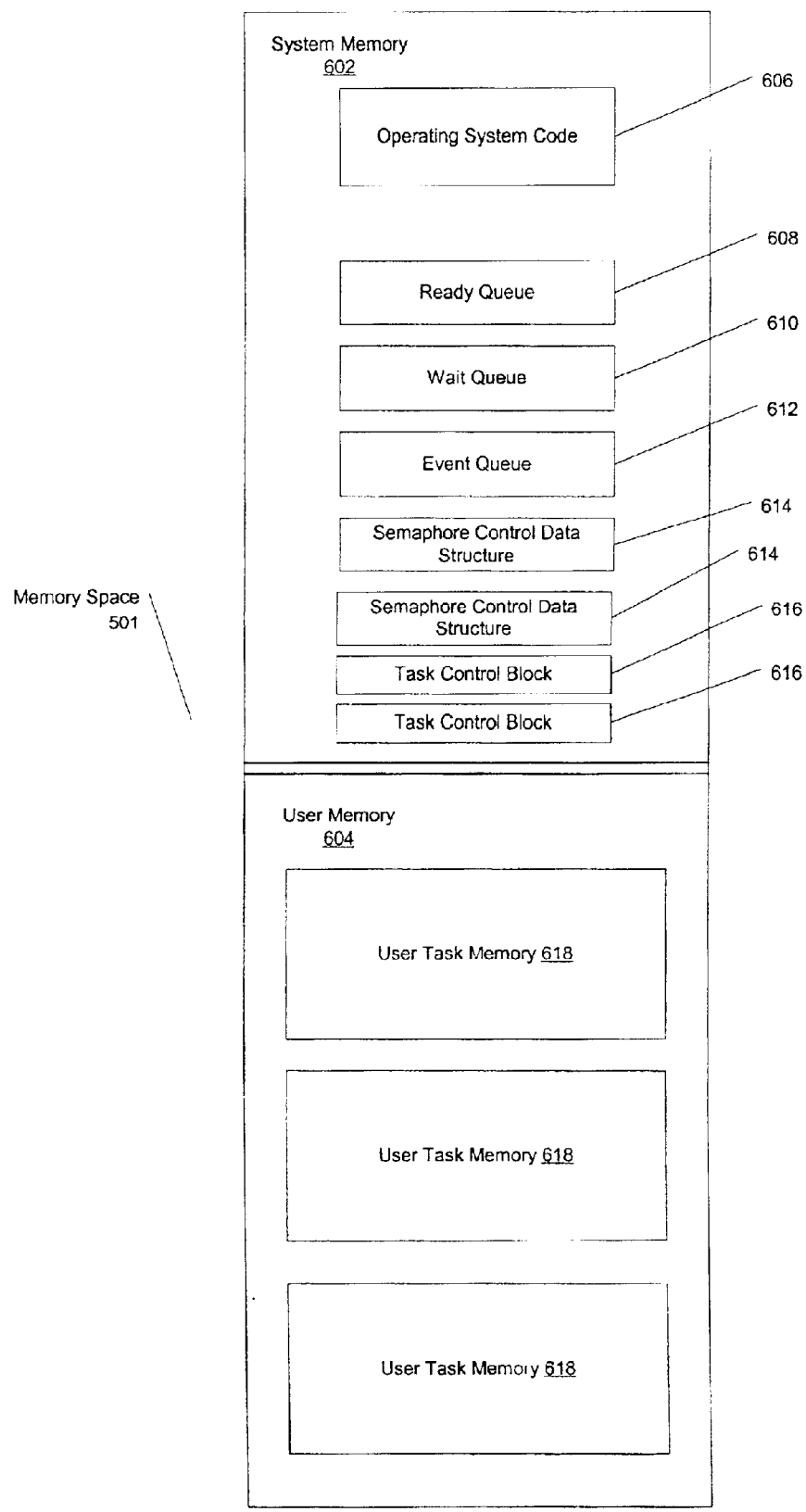
FIG. 6 illustrates an example computer memory space, according to an example embodiment of the present invention.

FIG. 6 illustrates an example memory space, according to an example embodiment of the present invention. The memory space 501 may be divided into a system memory space 602, generally accessible only by the operating system, and a user memory space 604 that may be accessed by user tasks. The system memory space may include memory space for the operating system executable code 606. The system memory space may include space for operating system queues, including a ready queue 608, a wait queue 610, and an event queue 612. It may be convenient to store the space required for these queues contiguously in the system memory space. However, it will be appreciated that other conventional methods of tracking entries in the queues may be used that do not require a separate contiguous storage space for each queue, e.g., a linked list may be formed of objects or table entries corresponding to tasks that have entries in a particular queue. The system memory space may also include storage space for semaphore control data structures 614 and storage for task control blocks 616.

The user memory space 604 may include user task memory allocations 618 divided into smaller subsets allocated to particular user tasks. Each task memory allocation 618 may include a code space for executable code for the task, as well as a data space to be used as workspace by the task when the task executes.

Operating System Queues

In the example embodiment, the operating system may control tasks using one or more queues, e.g., a wait queue and ready queue. Tasks that are currently blocked have a corresponding entry on the wait queue. Waiting tasks may also have an indication of what resource they are currently waiting for, for example stored as a field in the task's task control block. Alternatively, multiple wait queues may be included, e.g., one queue for each resource for which tasks are waiting. Tasks that are currently ready to execute are stored on the ready queue. Tasks may be stored in the ready queue sorted in priority order, i.e., the highest priority task currently ready but not executing is stored at the head of the ready queue. Periodically the priority of the currently executing task may be compared with the priority of the currently executing tasks. For example, this comparison may occur when some event changes the priority of the currently executing task, or when a new task is added to the ready queue. If the task at the head of the ready queue has a higher priority than the currently executing task, the currently executing task may be preempted and returned to an appropriate location on the ready queue. The task at the head of the ready queue may then begin execution.

It will be appreciated that when changes are made to task priorities due to priority inheritance that appropriate adjustments will need to be made to the operating system queues, e.g., entries stored in queues in priority order may need to be re-sorted.

Task Control Block

Figure 7:
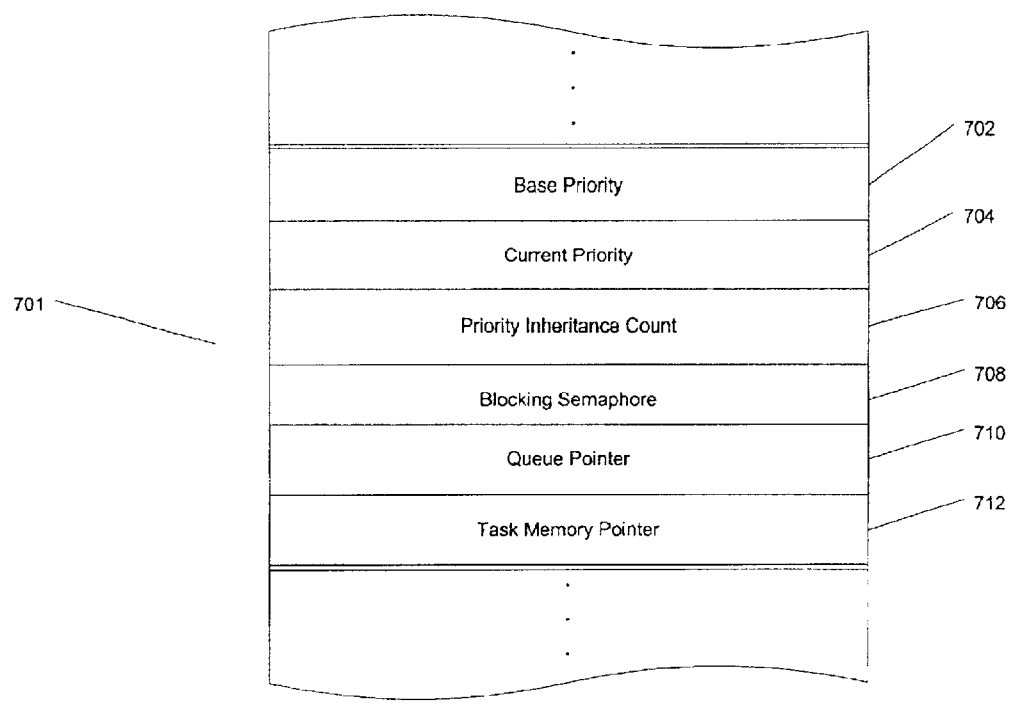
FIG. 7 illustrates an example task control block, according to an example embodiment of the present invention.

An example task control block 701 is illustrated in FIG. 7, according to an example embodiment of the present invention. The example task control block may be included as part of a computer operating system, with a task control block included for each task in the system. The task control block may be a pre-defined memory object, if the system is implemented using object-oriented programming techniques.

The example task control block may include a variable 702 indicative of normal or "base" priority of the task, i.e., the priority that the task should currently run, assuming the task has not received a higher, inherited priority. The task control block may further include a current priority 704, a variable that indicates the priority the task should run in light of any priority inheritance that may have occurred. In the example embodiment, 702 and 704 may be implemented as integer numbers from 0 to some predetermined upper bound (e.g., 255). It will be appreciated that any consistently-used convention for designating task priorities could be used, e.g., 0 could be the highest priority or the lowest priority, although for clarity in this description it is assumed that lower numbers imply lower priorities.

The example task control block may also include a priority inheritance variable, e.g., a priority inheritance count 706. The priority inheritance count may indicate the number of semaphores held by the task associated with the task control block that are involved with a priority inheritance. Initially, when a task is created, the priority inheritance count may be set to 0.

The example task control block may also include a blocking semaphore variable 708 that identifies a semaphore which has caused the corresponding task to block. This variable may be a pointer to the semaphore control data structure for the semaphore. It will be appreciated that any other unique mechanism for uniquely identifying the semaphore may be used. Initially, the variable 708 may be set to a NULL value, assuming a newly created task is not blocked.

The example task control block may also include a queue pointer 710. The queue pointer may be used to form a null-terminated linked list of task control blocks for tasks that are currently waiting in an operating system queue, e.g., a queue of tasks waiting to receive a particular semaphore. It will be appreciated that additional pointers may be included, e.g., so that a doubly-linked list may be formed, allowing more efficient queue handling.

The example task control block may also include a task memory pointer 712. The task memory pointer may be used to identify the portion of memory that has been allocated to the task. It will be appreciated that additional pointers may be included to separately identify code and data memory space, or if task have multiple portions of memory allocated to them.

It will be appreciated that many other variables could be included in the task control block in support of other operating system functions. It will also be appreciated that different data structures may be used for individual task control blocks. It will also be appreciated that different data structures could be used to store all task control blocks in the system. For example, all task control blocks in a system may be stored in a table, as a linked list, or as other conventional data structures.

Semaphore Control Data Structure

Figure 8:
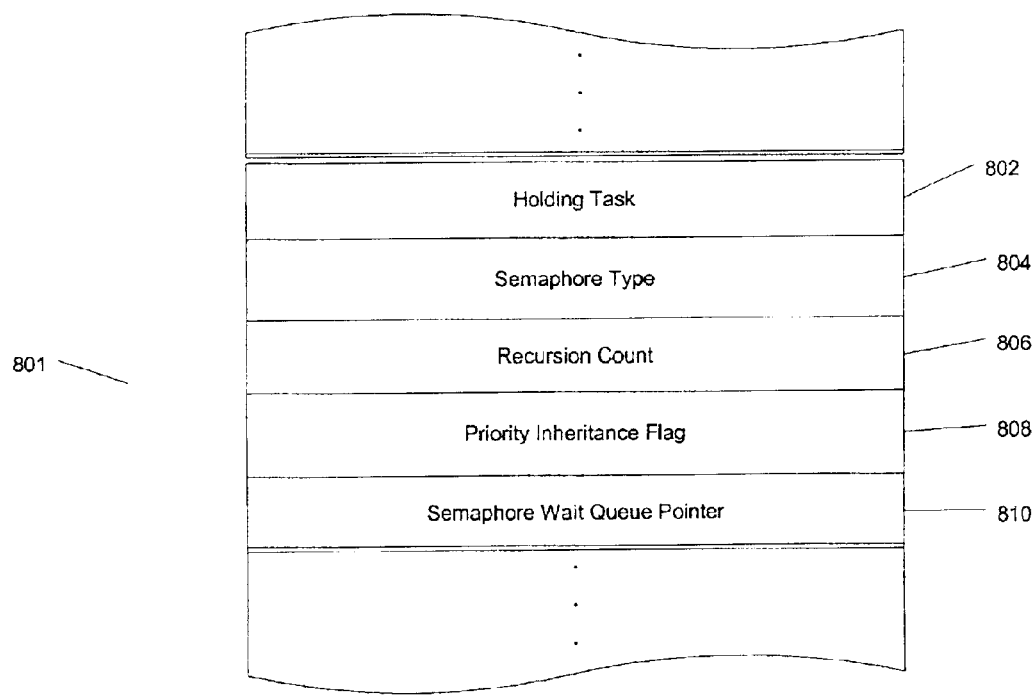
FIG. 8 illustrates on example semaphore control data structure, according to an example embodiment of the present invention.

FIG. 8 illustrates an example semaphore control data structure 801, according to an example embodiment of the present invention. A semaphore control data structure may be included in a system for each semaphore in the system. The semaphore control data structure may be created when the corresponding semaphore is created.

It will be appreciated that any conventional data structure may be used for the semaphore control data structure. For example, in an object oriented system, a semaphore control data structure may be a memory object. All semaphore control data structures may be stored together in a table, linked list, or other conventional data structure. A semaphore control data structure may include one or more variables, as illustrated in FIG. 8.

An example semaphore control data structure may include an identifier 802 which uniquely identifies the task currently owning or holding the semaphore. The identifier 802 may be a pointer to the task control block for the corresponding task.

It will be appreciated other conventional mechanisms for identifying the semaphore-holding task may be used, e.g., a task identification number.

An example semaphore control data structure may include a field or variable 804 indicative of the semaphore type. This field may indicate whether the semaphore is a binary semaphore, a mutual exclusion semaphore, or some other type of a semaphore. This field may also include one or more flags indicating various properties of the semaphore, e.g., a flag indicating whether the semaphore is inversion safe, whether the semaphore can be deleted, etc.

An example semaphore control data structure may include a recursion count 806. The recursion count indicates the number of times the task currently holding the semaphore has recursively taken the semaphore. When a task first takes a semaphore, the recursion count may be set to zero. It will be appreciated that any other consistently-used conventional procedure for tracking whether a semaphore has been taken recursively may be used.

An example semaphore control data structure may also include a priority inheritance flag 808. The priority inheritance flag may indicate whether the semaphore has been involved in a priority inheritance. When the semaphore is initially created or taken for the first time, the priority inheritance flag may be set to zero. Each time the associated semaphore is released, the priority inheritance flag may be set to zero.

The semaphore control data structure may also include a wait queue pointer 810. This pointer identifies the queue containing jobs waiting for the corresponding semaphore. The wait queue pointer in the semaphore control data structure may then point to the task control block for the highest priority task waiting for the semaphore. Each task control block may include a queue pointer. All task control blocks of tasks waiting for the semaphore may form a null-terminated linked list using the queue pointer in the task control block. It will be appreciated that other conventional procedures for keeping track of the tasks waiting for a particular semaphore may be employed, e.g., instead of a pointer, the semaphore control data structure could include space to store an entire queue of entries, each entry corresponding to a task waiting for the semaphore.

It will be appreciated that other fields or variables may be included as part of the example semaphore control data structure, e.g., a variable identifying a resource that is controlled by the semaphore.

Alternative Embodiment

An alternative embodiment may be provided according to the present invention. Like the example embodiment described above, the alternative embodiment may include modifications to conventional give and take functions for inversion safe mutual exclusion semaphores provided as part of a computer operating system or other computing environment. The alternative embodiment may also, like the example embodiment described above, include task control blocks for tasks in the system, and semaphore control data structures for semaphores in the system. However, the alternative embodiment may include additional fields in both the task control blocks and the semaphore control data structures.

Figure 9:
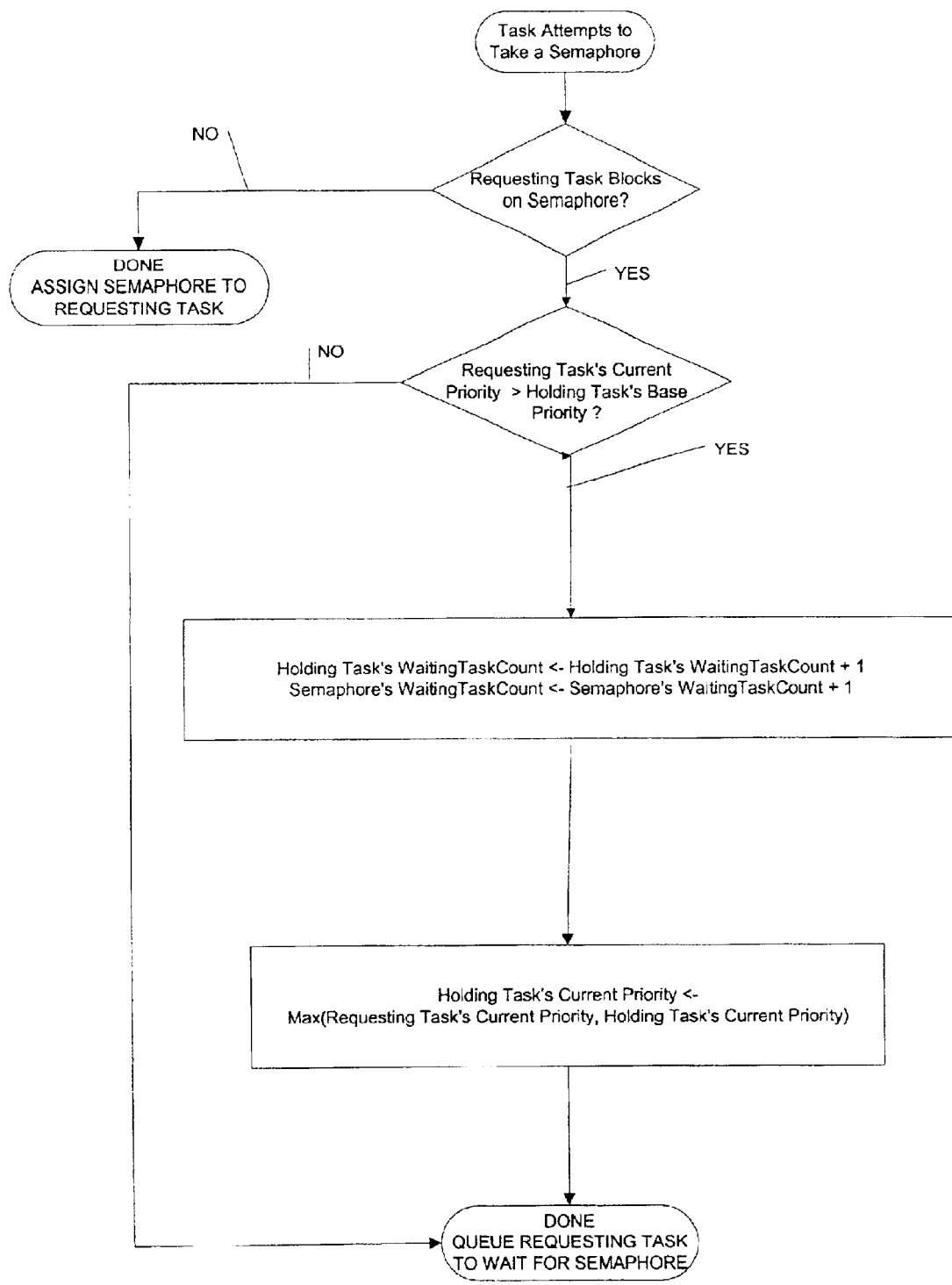
FIG. 9 illustrates an alternative example procedure for handling priority inheritance during a semaphore request, according to an alternative embodiment of the present invention.

FIG. 9 illustrates an alternative example procedure for handling priority inheritance during a semaphore request or "take", according to an alternative embodiment of the present invention. The alternative example take procedure is similar to the take procedure used in the example embodiment, described above and illustrated in FIG. 3. However, differences between the example take procedure and the alternative example give procedure may be present, as described below in relation to step 904.

In step 904, the requested semaphore's waiting task count may be incremented. The requested semaphore's waiting task count may indicate the number of higher priority tasks that are currently waiting for the requested semaphore. The holding task's waiting task count may also be incremented. The holding task's waiting task count may indicate the number of higher priority tasks that are currently waiting for any inversion safe mutual exclusion semaphore held by the task.

Figure 10:
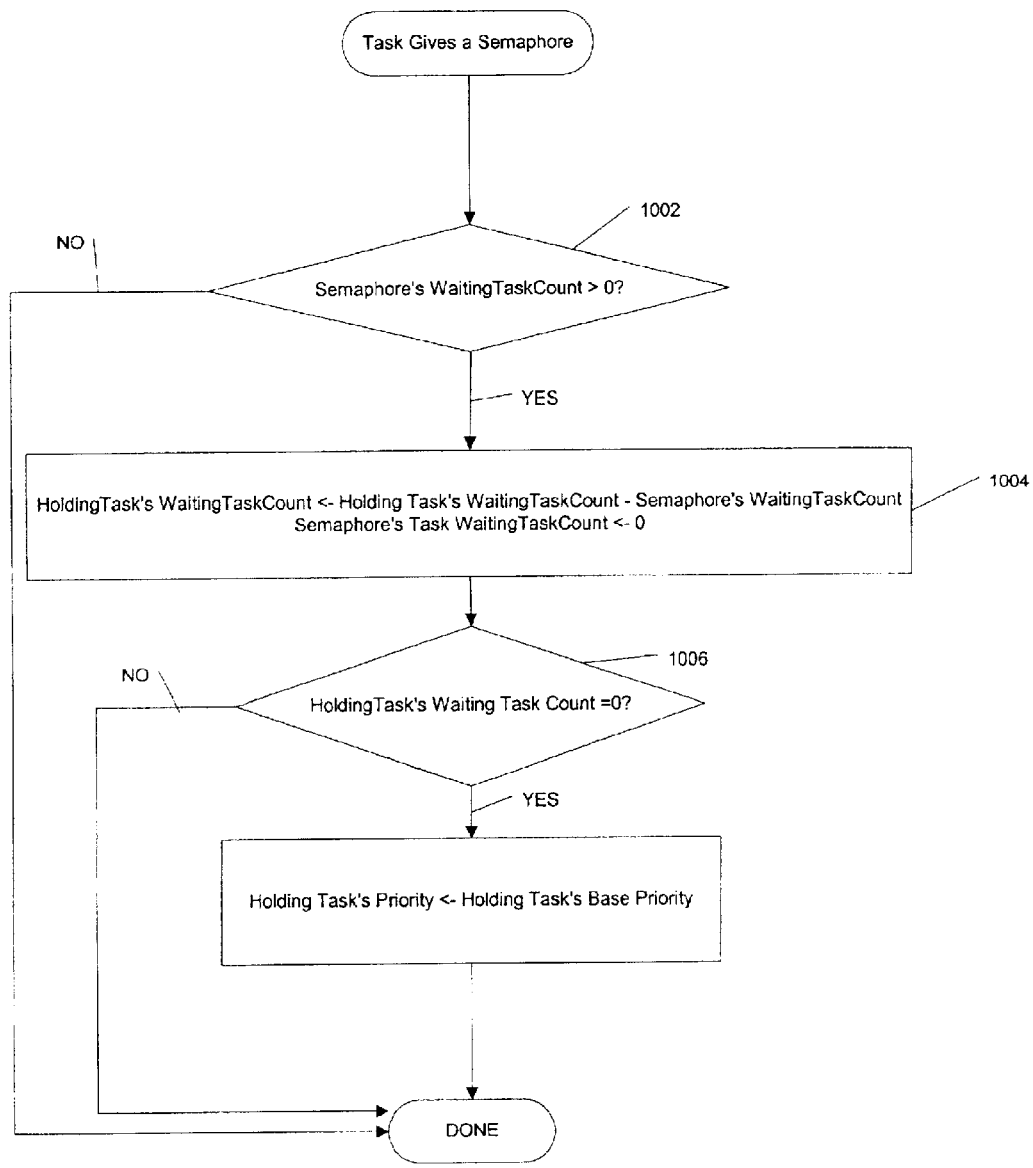
FIG. 10 illustrates an alternative example procedure for handling priority inheritance during the release of a semaphore, according to an alternative embodiment of the present invention.

FIG. 10 illustrates an alternative example release or "give" procedure, according to an alternative embodiment of the present invention. The alternative example give procedure is similar to the give procedure used in the example embodiment, described above and illustrated in FIG. 4. However, differences between the example give procedure and the alternative example give procedure may be present, as described below in relation to steps 1002–1006 of the alternative example give procedure.

In step 1002, whether the requested semaphore is presently involved in a priority inheritance may be determined by testing the semaphore's waiting task count. If the semaphore's waiting task count is zero, no higher priority tasks are waiting for the semaphore, and thus there should be no priority inheritance involving this semaphore. However, if the semaphore's waiting task count is greater than zero, the semaphore may be involved in a priority inheritance situation, and the alternative example procedure may continue with step 1004.

In step 1004, the holding task's waiting task count may be adjusted to reflect the release of the requested semaphore. The holding task's waiting task count may be decremented by the released semaphore's waiting task count. The released semaphore's waiting task count may then be set to zero. It will be appreciated that, if the task which is given the released semaphore is not the highest priority task currently waiting for the semaphore, modifications of this step may be required. For example, such modifications may be needed if the semaphore's queue is a first-in-first-out queue, rather than a priority queue. In this case, additional priority inheritance may need to occur if a higher priority task is still waiting for the semaphore after it has been released by the holding task and assigned to a receiving task.

In step 1006, the task that is releasing the semaphore may be tested to determine whether it should continue to maintain an elevated inherited priority. If the holding task's waiting task count is zero, then no higher priority tasks are waiting for semaphores held by the holding task, thus the holding task may no longer be involved in a priority inheritance situation. In this case, the alternative example procedure may continue by reducing the task's priority to a base level.

When the alternative example procedure is completed, the released semaphore may be assigned to a waiting task, just as it would be in a conventional semaphore release procedure.

Figure 11:
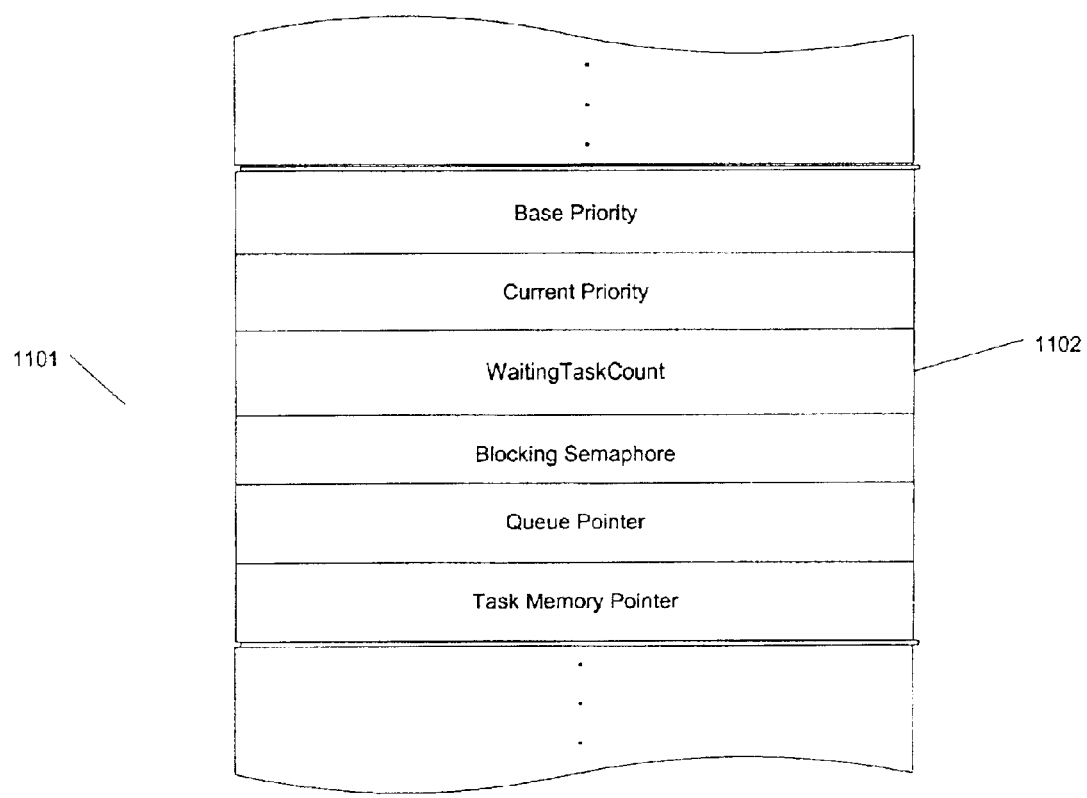
FIG. 11 illustrates an alternative example task control block, according to an alternative embodiment of the present invention.

FIG. 11 illustrates an alternative example task control block 1101, according to an alternative embodiment of the present invention. The alternative example task control block is similar to the example task control block previously illustrated in FIG. 7. However, in place of the priority inheritance count shown in FIG. 7, a different type of priority inheritance variable may be included. The alternative task control block may include a waiting task count 1102, a counter that indicates the number of higher priority tasks waiting for inversion safe mutual exclusion semaphores held by the task. Initially, when a task is created, the waiting task count for the task may be set to zero.

Figure 12:
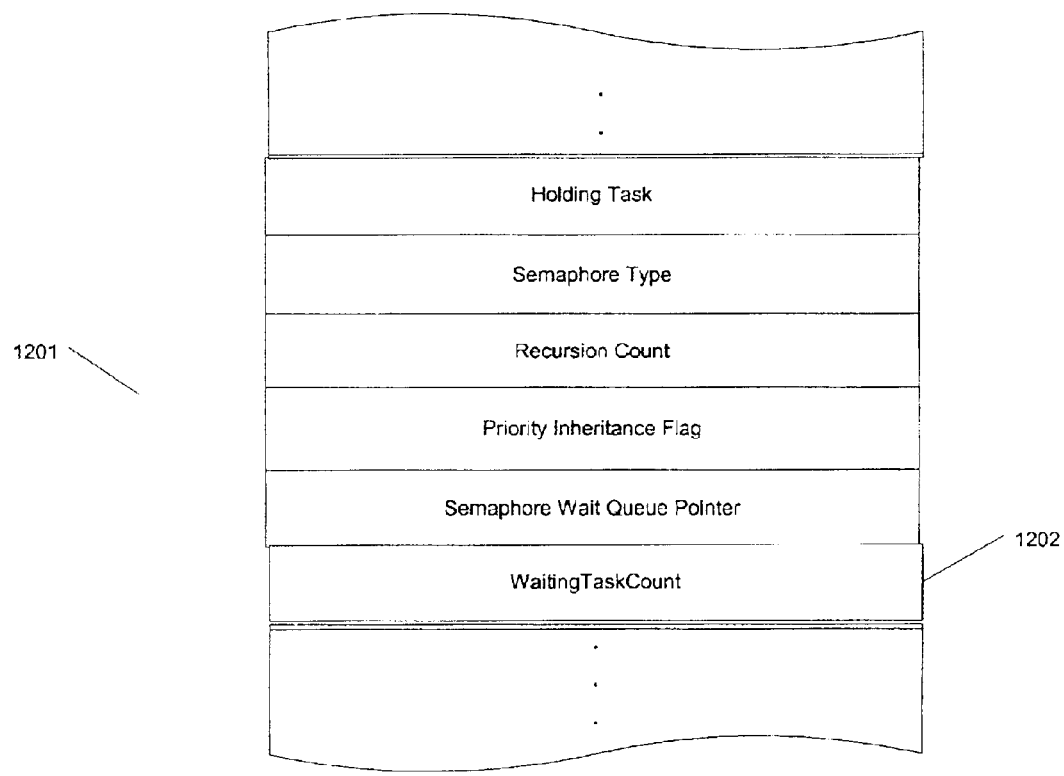
FIG. 12 illustrates an alternative example semaphore control data structure, according to an alternative embodiment of the present invention.

FIG. 12 illustrates an alternative example semaphore control data structure 1201, according to an alternative example embodiment of the present invention. The alternative example semaphore control data structure is similar to the example semaphore control data structure described above and illustrated in FIG. 8. However, in place of the priority inheritance flag included in the example semaphore control data structure, the alternative example semaphore control data structure may include a waiting task count 1102. The semaphore's waiting task count may be a counter that indicates the number of tasks waiting for the semaphore that have higher priority than the task holding the semaphore. When a task first takes a semaphore, the semaphore's waiting task count may be set to zero, indicating that the no other tasks are waiting for the semaphore and that the task is not involved in a priority inheritance because of this semaphore. Other fields in the alternative example semaphore control data structure may be the same as the fields shown for the example semaphore control data structure described above and illustrated in FIG. 8.

It will be appreciated that the alternative embodiment also may adjust waiting task counts and the semaphore raise counts during other operating system actions that involve tasks, e.g., when tasks are deleted, or when a waiting task times out and stops waiting for a semaphore.

Second Alternative Embodiment

A second alternative embodiment may be provided according to the present invention. Like the example embodiment described above, the second alternative embodiment may include modifications to conventional give and take functions for inversion safe mutual exclusion semaphores provided as part of a computer operating system or other computing environment. The second alternative embodiment may also, like the example embodiment described above, include task control blocks for tasks in the system, and semaphore control data structures for semaphores in the system. However, the second alternative embodiment may include modifications to handle the situation where a task that caused a priority inheritance by requesting a semaphore is no longer interested in acquiring the semaphore, e.g., when the "timeout" specified in the requesting task's take operation expires, or when the requesting task is deleted.

Figure 13:
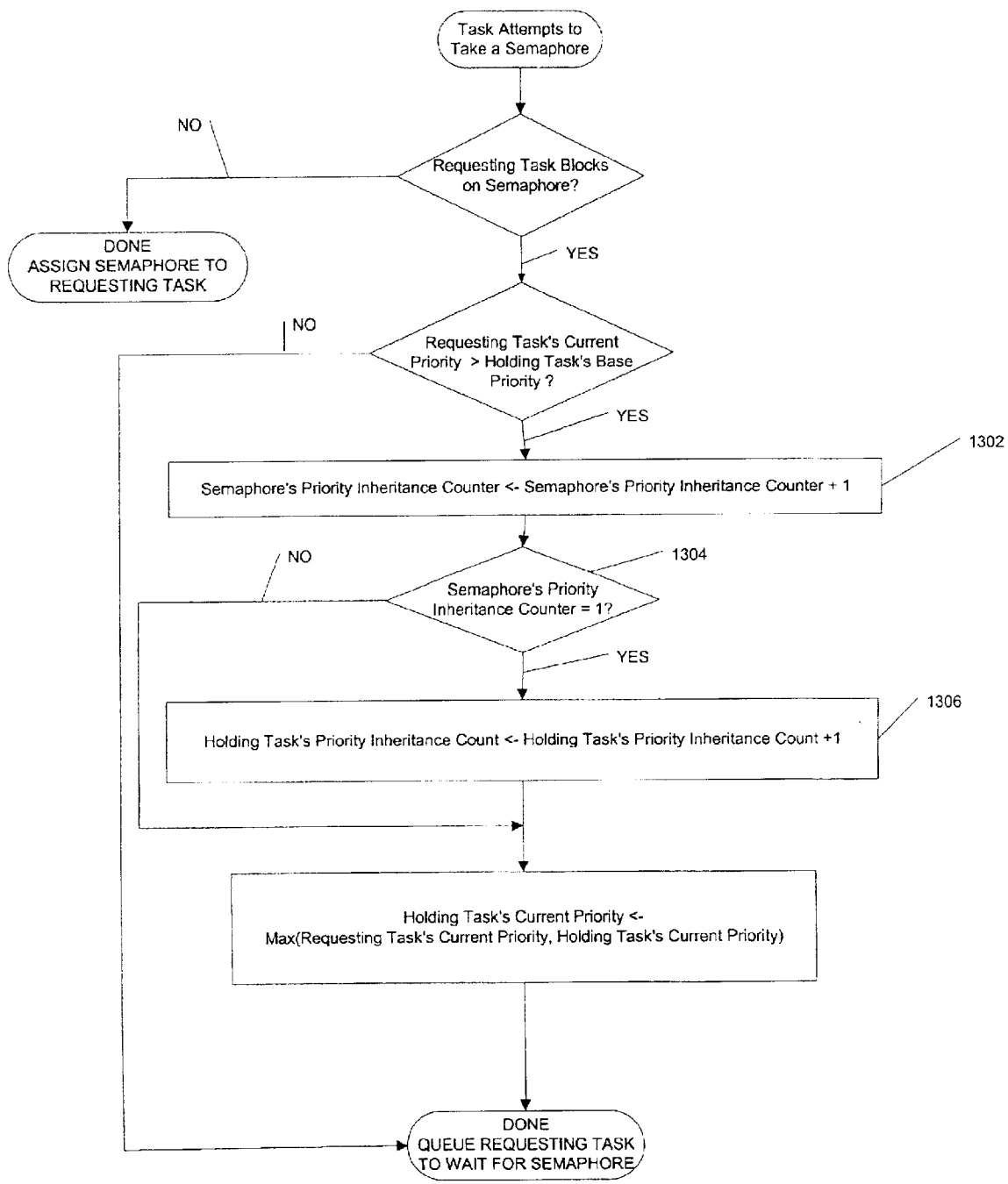
FIG. 13 illustrates a second example procedure for handling priority inheritance during a semaphore request, according to a second alternative embodiment of the present invention.

FIG. 13 illustrates a second alternative example procedure for handling priority inheritance during a semaphore request or "take", according to a second alternative embodiment of the present invention. The second alternative example request or "take" procedure may be identical to the example "take" procedure illustrated above in FIG. 3, with the following exceptions.

In step 1302, when a requesting task's current priority is greater than the base priority of the task holding the, a variable associated with the semaphore may be adjusted to reflect the fact that a higher priority task has blocked on the requested semaphore. This variable may be a priority inheritance counter included in a semaphore control data structure associated with the semaphore. It will be appreciated that a priority inheritance counter associated with a semaphore may initially be set to zero when a semaphore is created or received.

In step 1304, the variable associated with the semaphore may be tested to determine whether the requested semaphore is already involved in a priority inheritance, e.g., by determining whether the current semaphore request is the first higher priority task to block on the semaphore. This determination may be accomplished, for example, by testing whether the priority inheritance counter, included in the semaphore control data structure associated with the semaphore, is equal to 1. If the semaphore is already involved in a priority inheritance, the second alternative example procedure may continue with step 1306, otherwise step 1306 may be skipped.

In step 1306, the requested semaphore is currently not involved in a priority inheritance, and a priority inheritance variable associated with the task holding the semaphore may be adjusted, in the same manner as was illustrated previously in step 310 of the example "take" procedure.

Figure 14:
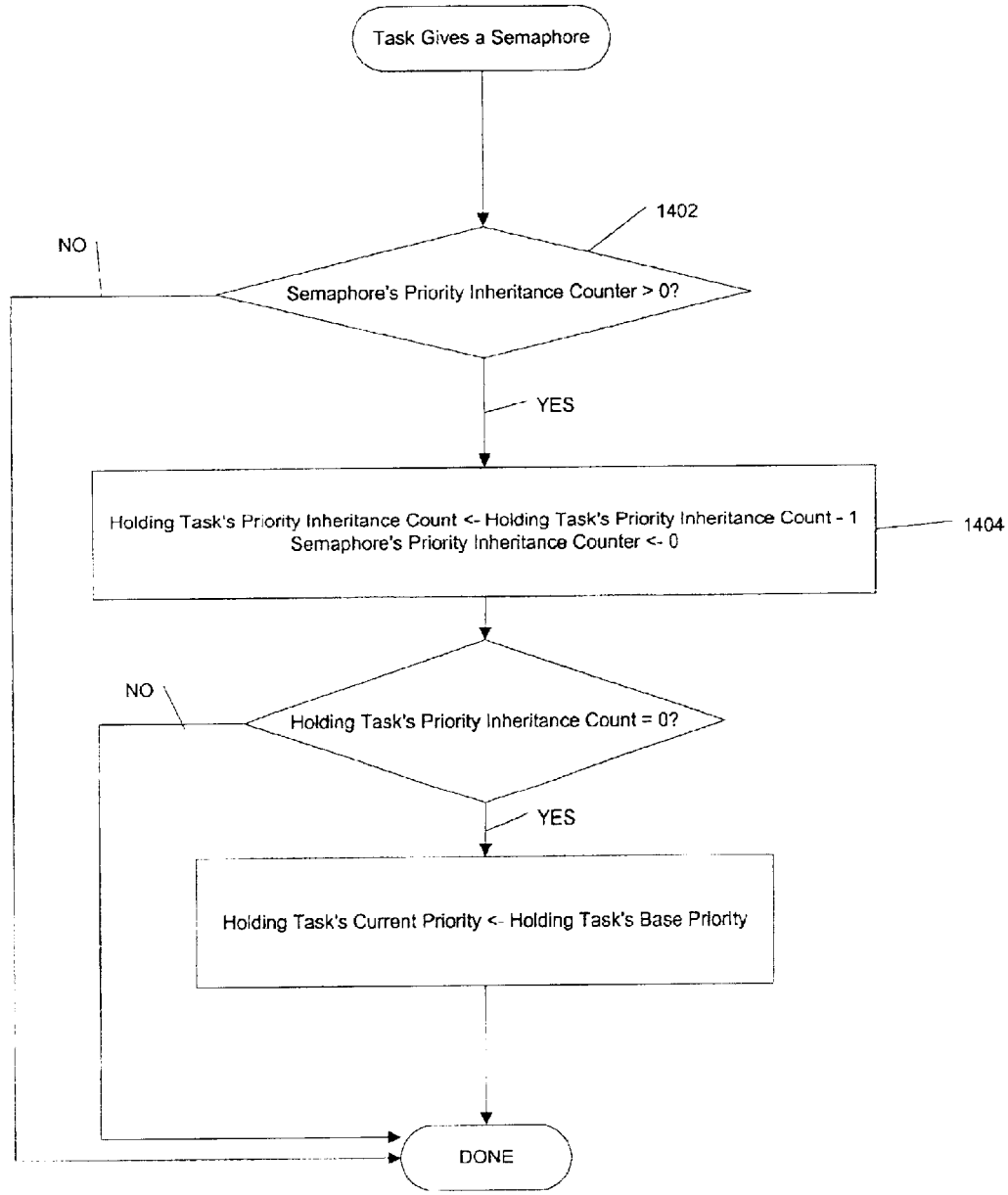
FIG. 14 illustrates a second example procedure for handling priority inheritance during the release of a semaphore, according to a second alternative embodiment of the present invention.

FIG. 14 illustrates a second alternative procedure for handling priority inheritance during the release or "give" of a semaphore, according to a second alternative embodiment of the present invention. The second alternative "give" procedure may be identical to the example "give" procedure illustrated above in FIG. 4, with the exceptions described below.

In step 1402, the second alternative give procedure may determine whether the semaphore being released is currently involved in a priority inheritance. This determination may be made, for example, by testing whether a priority inheritance counter associated with the released semaphore is greater than zero, instead of testing a priority inheritance flag as was previously described in the example embodiment. If the semaphore is currently involved in a priority inheritance, the second alternative give procedure may continue with step 1404. Otherwise the second alternative procedure may be completed, followed by any other conventional steps for giving a semaphore.

Step 1404 of the second alternative give procedure is analogous to step 406 of the example give procedure illustrated previously in FIG. 4. As in step 406 of FIG. 4, the task that currently holds the semaphore may have its priority inheritance variable adjusted to reflect the release of the semaphore. For example, if the task's priority inheritance variable is implemented as a count, the count may be decremented. Also, a variable associated with the semaphore may be adjusted to indicate that the semaphore is no longer involved in a priority inheritance. However, instead of adjusting a priority inheritance flag as in step 406 of FIG. 4, the priority inheritance counter associated with the semaphore may be set to zero, to indicate the semaphore is no longer involved in a priority inheritance.

Figure 15:
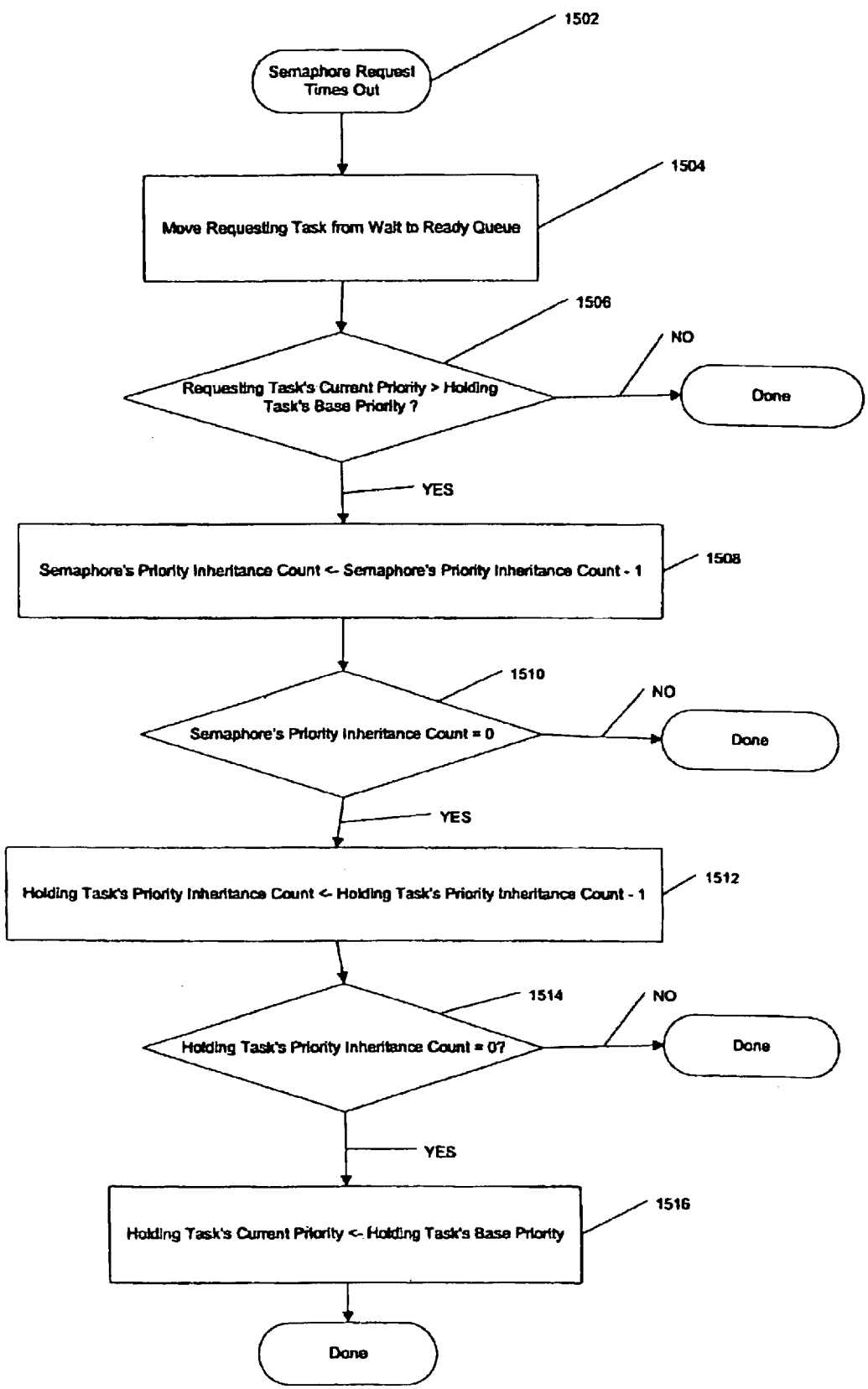
FIG. 15 illustrates an example procedure for handling priority inheritance when a requesting task's semaphore request times out, according to a second alternative embodiment of the present invention.

FIG. 15 illustrates an example procedure for handling priority inheritance when a requesting task's semaphore request times out, according to a second alternative embodiment of the present invention. It will be appreciated that this timeout handling procedure may be incorporated as part of the second alternative take procedure, or executed as a separate procedure that is included as part of a conventional mechanism for controlling task timeouts.

In step 1502, a request for a semaphore times out. Any conventional procedure for tracking timeout limits of tasks waiting for a semaphore may be used.

In step 1504, the task whose semaphore request has timed out may be moved from the wait queue to the system ready queue.

In step 1506, it may be determined whether the timed out semaphore request was involved in a priority inheritance. This may be accomplished, for example, by comparing the current priority of requesting task, whose semaphore request has timed out, with the base priority of the semaphore holding task. If the request is not involved in a priority inheritance, the example time out handling procedure may be completed, followed by any other conventional steps for handling a semaphore request time out. If the request is involved in a priority inheritance, the example time out handling procedure may continue with step 1508.

It will be appreciated that, if the requesting task's current priority has been reduced since it first requested the semaphore, the priority comparison of the current priority of the requesting task with the base priority of the semaphore holding task may not detect that the semaphore request was involved in a priority inheritance. Accordingly, it will be appreciated that other procedures in the system that may result in lowering the priority of the requesting task may need to be modified to adjust the priority inheritance variables associated with the holding task and the semaphore when the priority of a requesting task is reduced. It will also be appreciated that other conventional mechanisms could be used to track whether a particular request is involved in a priority inheritance, e.g., by including a variable in a task's task control block that tracks whether the task's request for a semaphore has resulted in a priority inheritance.

In step 1508, a variable associated with the semaphore that indicates the number of higher priority tasks waiting for the semaphore may be adjusted. For example, a priority inheritance count included in the semaphore's control data structure may be decremented.

In step 1510, the semaphore may be tested to determine whether it is still involved in a priority inheritance, e.g., by testing whether the priority inheritance count included in the semaphore's control data structure is equal to zero. If the semaphore is still involved in a priority inheritance, the example timeout handling procedure may be completed, followed by any other conventional steps for handling a semaphore request time out. Otherwise, the example time out handling procedure may continue with step 1512.

In step 1512, the semaphore is no longer involved in a priority inheritance. Accordingly any variable associated with the task that indicates the number of semaphores held by the task that are involved in priority inheritance situations may be adjusted, e.g., by decrementing the priority inheritance count included in the task's associated task control block.

In step 1514, whether the task is still holding any semaphores involved in priority inheritance may be determined, for example by testing whether the priority inheritance count included in the task's associated task control block is equal to zero. If the task still holds a semaphore that is involved in a priority inheritance, the example timeout handling procedure may be completed, followed by any other conventional steps for handling a semaphore request time out. Otherwise, the example timeout handling procedure may continue with step 1516.

In step 1516, the task holding the requested semaphore no longer holds any semaphores involved in a priority inheritance. Accordingly, the holding task's current priority may be reduced to the holding task's base priority. The example timeout procedure may then be completed, with any other conventional steps for handling a semaphore request time out.

Figure 16:
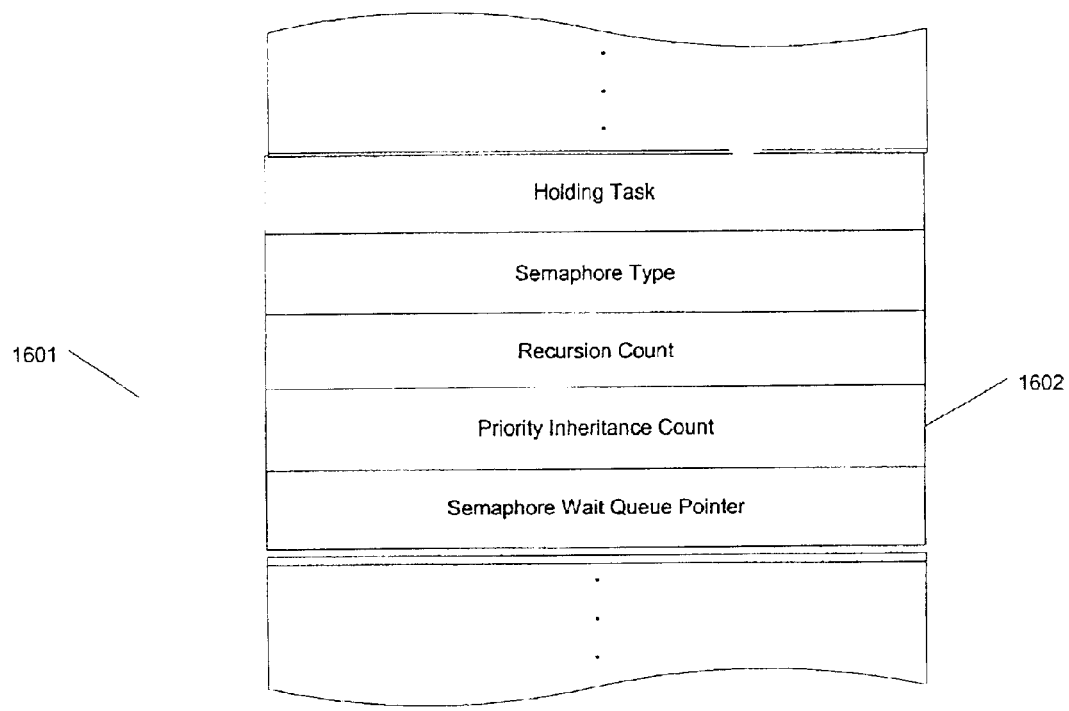
FIG. 16 illustrates a second alternative example semaphore control data structure, according to a second alternative embodiment of the present invention.

FIG. 16 illustrates a second alternative example semaphore control data structure, 1601, according to a second alternative embodiment of the present invention. The second alternative example semaphore control data structure may be the same as the example control data structure illustrated in FIG. 8, except that, in place of a priority inheritance flag, a priority inheritance count 1602 may included. This priority inheritance count may initially be set to zero when the semaphore is created, and thereafter may be used to indicate the number of tasks which are waiting for the semaphore which have higher current priorities than the base priority of the task holding the semaphore.

It will be appreciated that a procedure similar to the one described above for handling priority inheritance in a task timeout may be used for handling a task deletion. In such a deletion procedure, the deleted task would not be added to the ready queue, and other conventional steps that are used to handle task deletion may be included.

Modifications

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

What is claimed is:

1. A method comprising:
    raising a current priority of a task to a current priority of a higher priority task when the higher priority task blocks on a resource held by the task;
    incrementing a priority inheritance variable when the higher priority task blocks on the resource held by the task, the priority inheritance variable associated with the task and configured to be indicative of the number of resources held by the task that higher priority tasks are waiting to receive;
    decrementing the priority inheritance variable when the task releases the resource that the higher priority task has blocked on;
    testing the priority inheritance variable; and
    lowering the current priority of the task when testing the priority inheritance variable indicates that the task holds no resources that are involved in a priority inheritance.

2. A method comprising:
    testing a priority inheritance variable associated with a task, the priority inheritance variable configured to have a value indicative of the number of inversion safe mutual exclusion semaphores held by the task that higher priority tasks are waiting to receive; and
    setting a current priority of the task to a base priority value when testing the priority inheritance variable indicates that no higher priority tasks are waiting to receive inversion safe mutual exclusion semaphores held by the task.

3. The method of claim 2, further comprising:
    raising the current priority of the task when a higher priority task blocks on an inversion safe mutual exclusion semaphore held by the task.

4. The method of claim 3, wherein, when raising the current priority of the task when the higher priority task blocks on the inversion safe mutual exclusion semaphore held by the task, the current priority of the task is raised to a current priority of the higher priority task that blocked on the inversion safe mutual exclusion semaphore held by the task.

5. The method of claim 2, further comprising:
    adjusting the priority inheritance variable when a higher priority task blocks on an inversion safe mutual exclusion semaphore held by the task.

6. The method of claim 5, wherein, when adjusting the priority inheritance variable when the higher priority blocks on the inversion safe mutual exclusion semaphore held by the task, the priority inheritance variable is incremented.

7. The method of claim 2, further comprising:
adjusting the priority inheritance variable when the task releases an inversion safe mutual exclusion semaphore.

8. The method of claim 7, wherein,
when adjusting the priority inheritance variable when the task releases the inversion safe mutual exclusion semaphore, the priority inheritance variable is decremented.

9. The method of claim 2, wherein the priority inheritance variable is included in a task control block for the task.

10. A method comprising:
raising a current priority of a task when a higher priority task blocks on an inversion safe mutual exclusion semaphore, the inversion safe mutual exclusion semaphore being held by the task;
incrementing a counter when the higher priority task blocks on the inversion safe mutual exclusion, the counter associated with the task and configured to have a value indicative of the number of inversion safe mutual exclusion semaphores held by the task that higher priority tasks are waiting to receive;
decrementing the counter when the task releases the inversion safe mutual exclusion semaphore; and
while the task still holds a second inversion safe mutual exclusion semaphore, setting the current priority of the task to a base priority value when the counter is decremented to a value that indicates that the task holds no inversion safe mutual exclusion semaphores involved in priority inheritance.

11. A system comprising:
a semaphore;
a variable, the variable associated with the semaphore and configured to indicate whether a pending request for the semaphore has resulted in a priority inheritance; and
a task holding the semaphore,
wherein the variable is configured to indicate a count of the number of pending requests for the semaphore made by tasks with higher priority than the task holding the semaphore.

12. A method comprising:
tracking a number of inversion safe mutual exclusion semaphores held by a task that higher priority tasks are presently blocked on, the tracking using only a predetermined amount of memory;
raising a current priority of the task when a higher priority task blocks on an inversion safe mutual exclusion semaphore held by the task; and
setting the current priority of the task to a base priority value whenever no higher priority tasks are waiting to receive any of the inversion safe mutual exclusion semaphores held by the task and the task still holds at least one inversion safe mutual exclusion semaphore.

13. An article of manufacture comprising a computer-readable medium having stored thereon instructions adapted to be executed by a processor, the instructions which, when executed, define a series of steps to be used to control priority inheritance, said steps comprising:
raising a current priority of a task when a higher priority task blocks on an inversion safe mutual exclusion semaphore, the inversion safe mutual exclusion semaphore being held by the task;
incrementing a counter when the higher priority task blocks on the inversion safe mutual exclusion, the counter associated with the task and configured to have a value indicative of the number of inversion safe mutual exclusion semaphores held by the task that higher priority tasks are waiting to receive;
decrementing the counter when the task releases the inversion safe mutual exclusion semaphore; and
setting the current priority of the task to a base priority value when the counter is decremented to a value that indicates that the task holds no inversion safe mutual exclusion semaphores involved in priority inheritance.

14. An article of manufacture comprising a computer-readable medium having stored thereon instructions adapted to be executed by a processor, the instructions which, when executed, define a series of steps to be used to control priority inheritance, said steps comprising:
tracking a number of resources held by a task that higher priority tasks are presently blocked on, the tracking using only a predetermined amount of memory;
raising a current priority of the task when a higher priority task blocks on a resource held by the task; and
setting the current priority of the task to a base priority value whenever no higher priority tasks are waiting to receive any of the resources held by the task and the task still holds at least one resource.

* * * * *